(12) United States Patent
Jordan et al.

(10) Patent No.: US 10,591,110 B1
(45) Date of Patent: Mar. 17, 2020

(54) ATTACHMENT ASSEMBLY CONNECTABLE TO AN EXTERNALLY-THREADED ROD FOR SUPPORT OF AN ITEM THEREFROM

(71) Applicants: David S. Jordan, Knoxville, TN (US); Michael C. Jordan, Knoxville, TN (US)

(72) Inventors: David S. Jordan, Knoxville, TN (US); Michael C. Jordan, Knoxville, TN (US)

(73) Assignee: iTool Equipment Holding LLC, Oak Ridge, TN (US)

( * ) Notice: Subject to any disclaimer, the term of this patent is extended or adjusted under 35 U.S.C. 154(b) by 0 days.

(21) Appl. No.: 16/350,108

(22) Filed: Sep. 26, 2018

Related U.S. Application Data

(60) Provisional application No. 62/606,621, filed on Sep. 29, 2017.

(51) Int. Cl.
*F16L 3/08* (2006.01)
*F16M 13/02* (2006.01)

(52) U.S. Cl.
CPC .................. *F16M 13/022* (2013.01)

(58) Field of Classification Search
CPC ........... F16M 13/00; F16L 5/08; F16B 3/0885
See application file for complete search history.

(56) References Cited

U.S. PATENT DOCUMENTS

| | | | | |
|---|---|---|---|---|
| 4,919,372 | A * | 4/1990 | Twist | F16L 5/08 174/156 |
| 5,199,675 | A * | 4/1993 | DeGuchi | F16B 37/0885 248/59 |
| 6,471,171 | B1 * | 10/2002 | VanderVelde | H02G 3/32 248/229.12 |
| 2008/0080956 | A1 * | 4/2008 | Whipple | F16B 37/0885 411/433 |

* cited by examiner

*Primary Examiner* — Amy J. Sterling
(74) *Attorney, Agent, or Firm* — Michael E. McKee

(57) ABSTRACT

An attachment assembly securable about a rod having external threads to enable a support item, such as a strut, to be supported by the rod at a desired location along the length thereof includes a body defining a substantially linear groove having a surface which is shaped substantially complementary to the shape of the external threads which extend along one side of the rod. A clamping arrangement is associated with the body for clamping the surface of the linear groove of the body in a meshed relationship with the external threads of the rod. A bracket to which a support item can be attached is fixedly secured to the body so that by clamping the surface of the linear groove of the body in a meshed relationship with the threads of the rod as aforesaid, the support item can be attached to the rod by way of the bracket.

20 Claims, 4 Drawing Sheets

ATTACHMENT ASSEMBLY CONNECTABLE TO AN EXTERNALLY-THREADED ROD FOR SUPPORT OF AN ITEM THEREFROM

The benefit of Provisional Application Ser. No. 62/606,621, filed Sep. 29, 2017 and entitled ATTACHMENT ASSEMBLY CONNECTABLE TO A THREADED ROD FOR SUPPORT OF AN ITEM THEREFROM, is hereby claimed. The disclosure of this referenced provisional application is incorporated herein by reference.

BACKGROUND OF THE INVENTION

This invention relates generally to means and methods for supporting items, such as electrical wires or conduits, from an overhead structure and relates, more particularly, to means by which items can be supported from a threaded rod used for suspending items from an overhead structure In a building environment in which it is desired to route electrical wires or conduits across the ceiling area of the building, it is common to install horizontally-oriented struts arranged in a ladder-style fashion across the ceiling area of the building and route the desired electrical wires or conduits along, or across, the struts of the ladder-style arrangement. Such struts are commonly suspended from overhead supporting structure, such as beams, by way of threaded rods whose upper ends are joined to the overhead supporting structure and whose lower ends are joined to the horizontally-extending struts. These threaded rods include those of a class having external threads which extend along a substantial portion of the length of the rods.

Heretofore, it has been difficult to attach additional struts along the length of the threaded rods (i.e. at locations therealong between the upper and lower ends of the rods) without first removing the struts which have already been joined to the lower ends of the rods.

It would be desirable to provide a new and improved assembly which can be secured to a threaded rod for subsequent securement of an additional item, such as an additional strut, along the length of the threaded rod.

Accordingly, it is an object of the present invention to provide a new and improved assembly which is securable to a threaded rod of the aforedescribed class.

Another object of the present invention is to provide an assembly to which an additional item, such as an additional strut, can be secured.

Still another object of the present invention is to provide such an assembly which takes advantage of the external threads of the threaded rods of this class.

Yet another object of the present invention is to provide such an assembly which can be readily attached to and detached from a threaded rod.

A further object of the present invention is to provide such an assembly which is uncomplicated in structure, yet effective in operation.

SUMMARY OF THE INVENTION

This invention resides in an attachment assembly securable about a rod having external threads which extend along a portion of the length of the rod to enable a support item, such as a strut, to be supported by the rod at a desired location along the portion of the length of the rod.

The attachment assembly includes a body having a linear groove defining a surface which is shaped substantially complementary to the shape of the external threads which extend along one side of the portion of the length of the rod and further includes means for clamping the surface of the body in a meshed relationship with the external threads which extend along the portion of the length of the rod. In addition, a bracket to which a support item can be attached is fixedly secured to the body so that by clamping the surface of the body in meshed relationship with the external threads which extend along the portion of the length of the rod, the support item can be attached to the rod by way of the bracket.

DETAILED DESCRIPTION OF AN ILLUSTRATIVE EMBODIMENT

Figure 1:
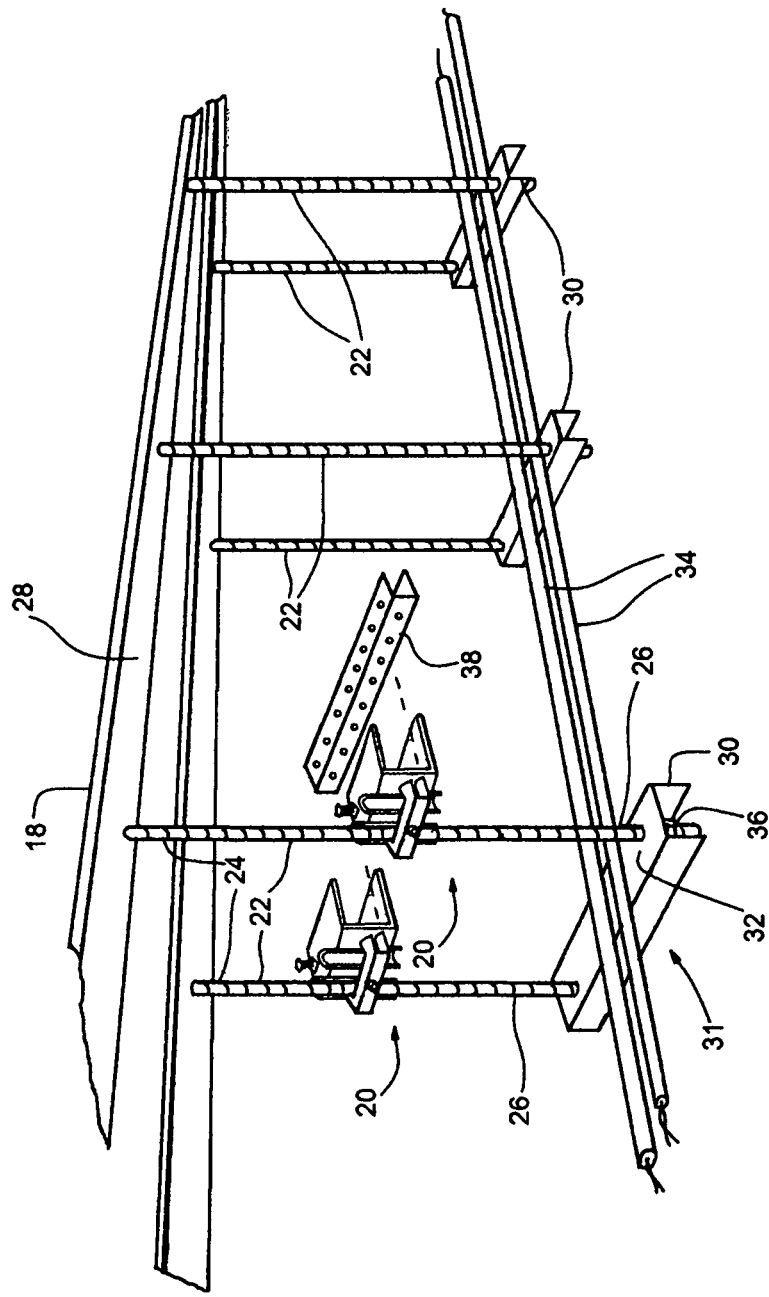
FIG. 1 is a perspective view of a pair of attachment assemblies within which features of the present invention are embodied shown utilized in a typical environment of intended use.

Turning now to the drawings in greater detail and considering first FIG. 1, there is illustrated a plurality of (i.e. two) attachment assemblies, wherein each assembly is indicated generally 20 and shown located in a building 18, and the building 18 represents a typical environment of intended use of the attachment assemblies 20. Briefly, the depicted FIG. 1 environment includes a plurality of threaded rods 22 having upper and lower ends 24 and 26, respectively, which are each supported (i.e. suspended) from an overhead structure 28 within the building 18 for supporting items, such as struts 30, in a substantially horizontal orientation. Within the depicted FIG. 1 environment, the depicted struts 30 are supported in a somewhat ladder-style arrangement, generally indicated 31, wherein the upper surfaces, indicated 32, of the struts 30 provide support surfaces along which an elongated item, such as electrical conduit 34, is routed across the ceiling area of the building 18. Each strut 30 is commonly supported in a substantially horizontal orientation by a pair of threaded rods 22 which are suspended from the overhead structure 28. Each strut 30 of the depicted FIG. 1 environment has an opening though which a corresponding one of the threaded rods 22 extends, and a nut 36 is treaded about each rod 22 for purposes of suspending the struts 30 from the rods 22, but this represents one manner of many in which the struts 30 can be suspended from the rods 22.

Before the attachment assembly 20 was invented, when it became necessary to mount an additional item, such as another strut 38 between each pair of threaded rods 22 to, for example, construct an additional ladder-style arrangement of struts 38 (only one shown in FIG. 1) across the ceiling area of the building 18 (wherein the additional ladder-style arrangement of struts 38 is desired to be located above the arrangement 31), each strut 30 commonly had to be detached from the pair of threaded rods 22 from which the strut 30 was suspended before another strut 38 could be secured to the rods 22. Of course, such a course of action could disrupt the arrangement 31 of struts 30 along which the elongated items 34 were already routed across the ceiling area of the building 18. However and as will be apparent herein, each attachment assembly 20 is capable of being attached to one of a pair of threaded rods 22 in a manner which does not require that the struts 30 (or the ladder-style arrangement 31 of struts 30) which may already be secured to the threaded rods 22 be detached from the rods 22.

Figure 2:
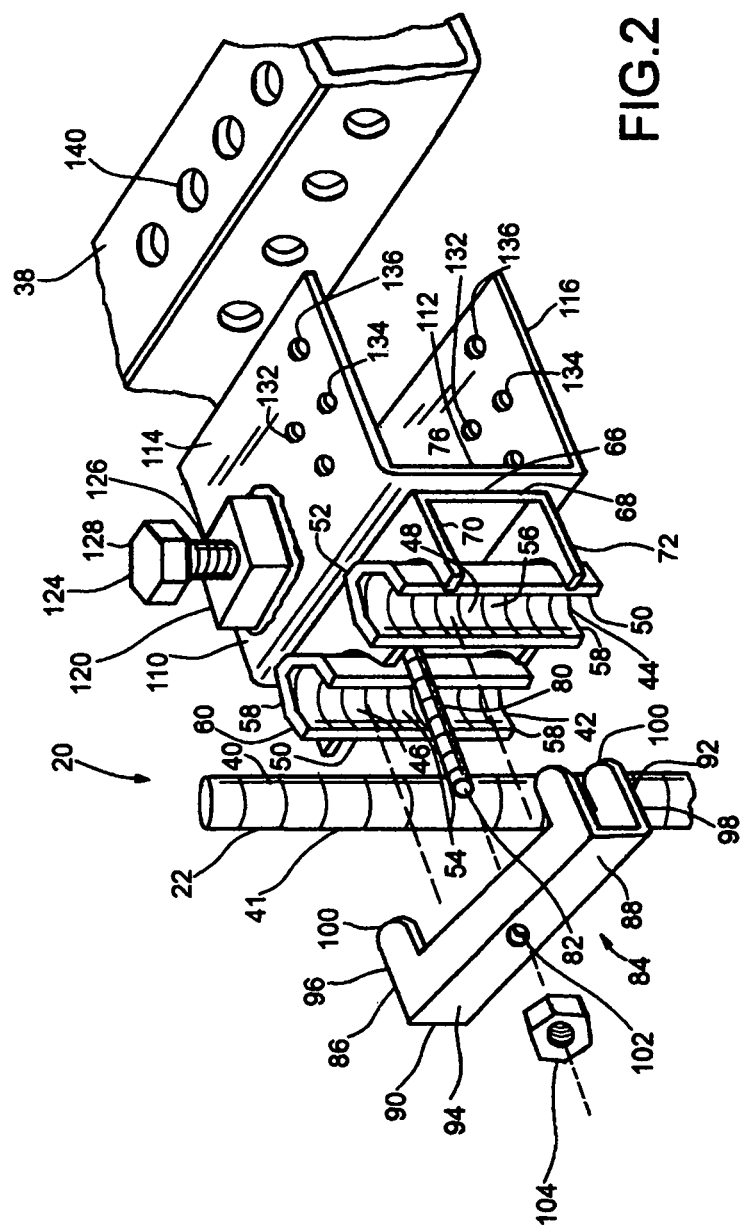
FIG. 2 is a perspective view of an attachment assembly of FIG. 1 and a threaded rod about which the attachment assembly is securable, shown exploded.
Figure 3:
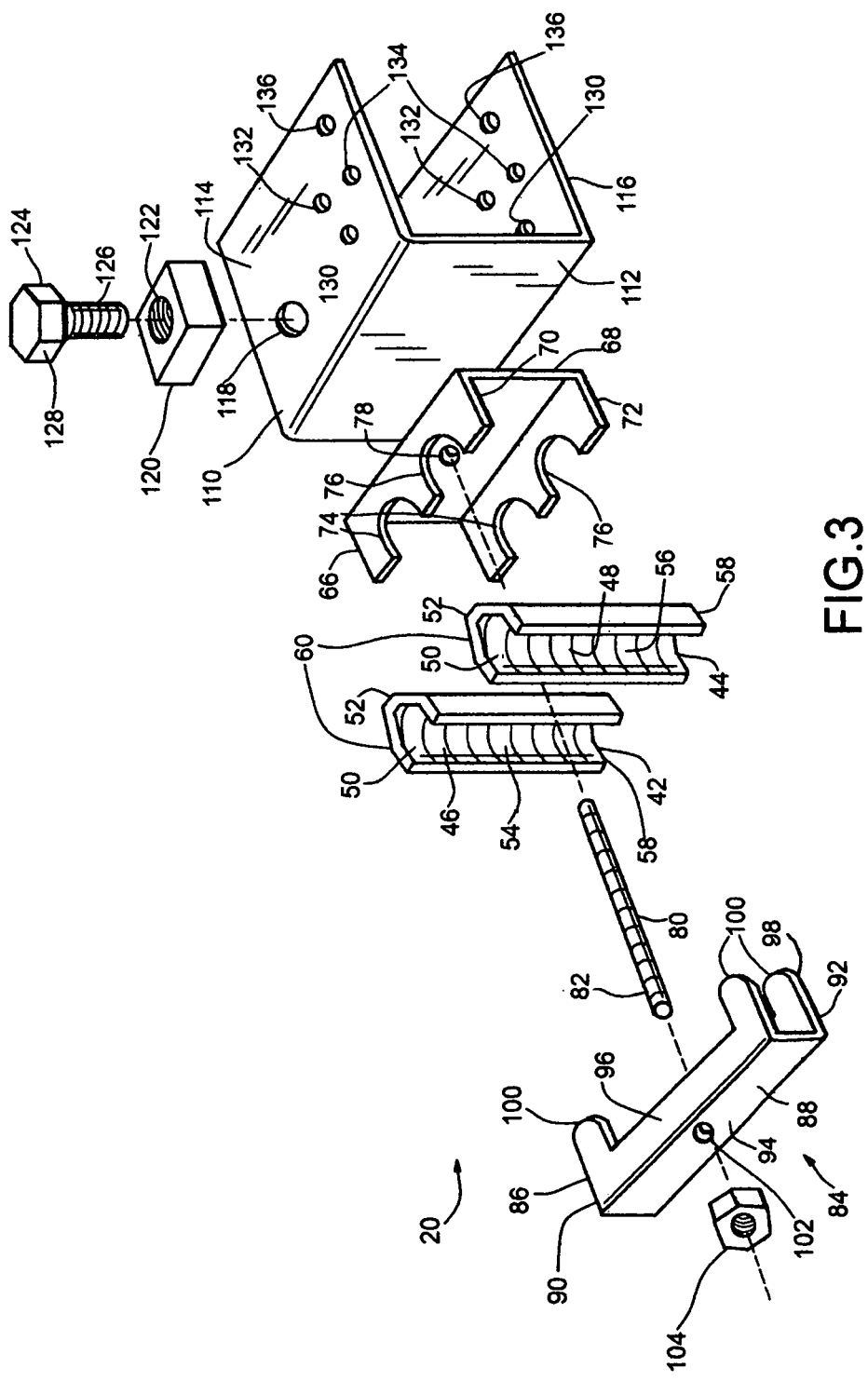
FIG. 3 is a perspective view of the attachment assembly of FIG. 2 and whose components are shown further exploded.
Figure 5:
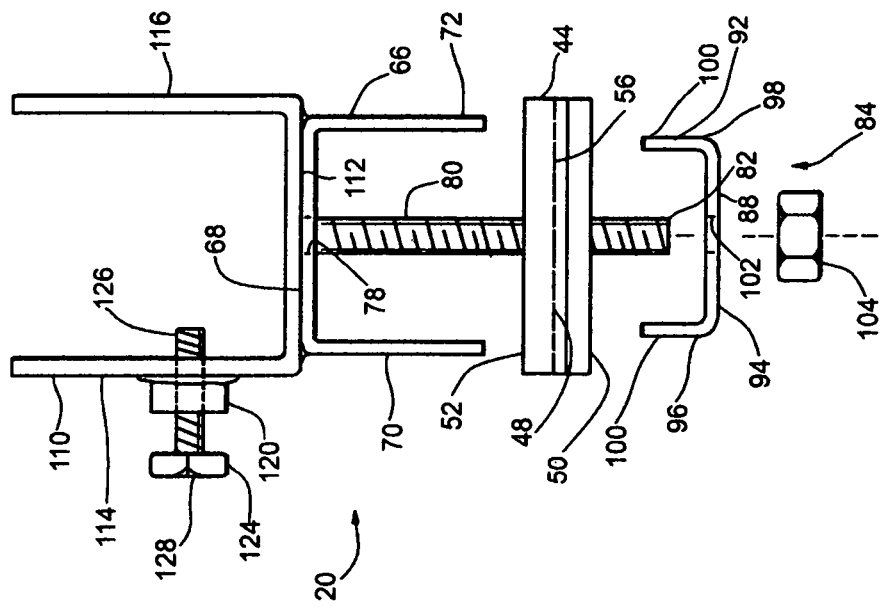
FIG. 5 is side elevation view of the attachment portion of FIG. 2 as seen from the right in FIG. 4.
Figure 4:
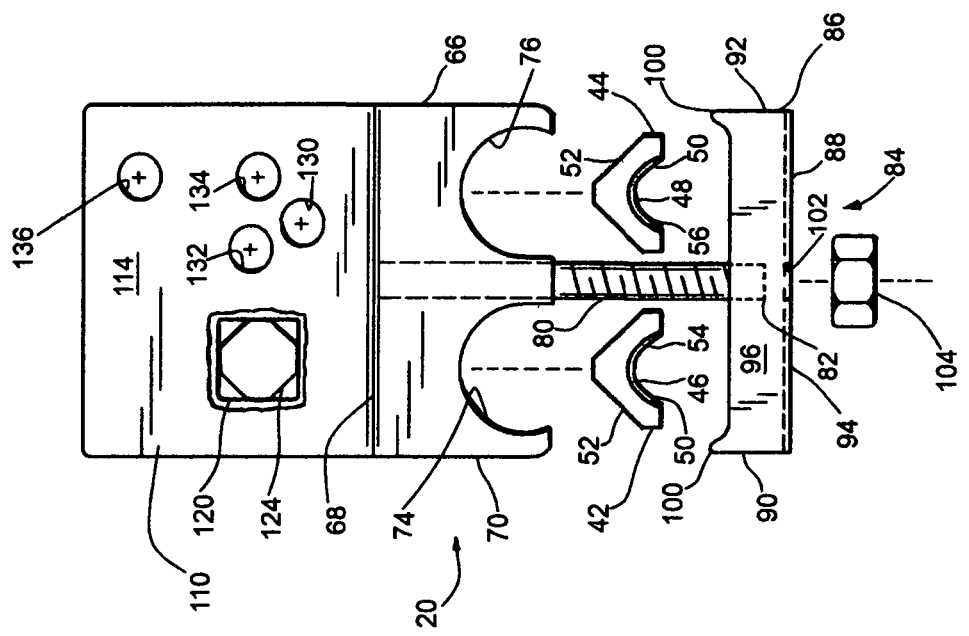
FIG. 4 is a top plan view of the attachment assembly of FIG. 2 as seen generally from above in FIG. 2.

With reference to FIG. 2, each threaded rod 22 includes an exterior surface 40 having a plurality of threads 41 which extending around the surface 40 of the rod 22 and which extend along the entire length of the rod 22. As will be apparent herein, each attachment assembly 20 includes componentry which is adapted to mesh with the external threads 41 of the threaded rod 22 to which the attachment assembly 20 is secured.

With reference to FIGS. 2-5, each attachment assembly 20 includes two elongated bodies 42, 44 having front and rear faces 50, 52, respectively, and each body 42 or 44 defines a linear groove 46 or 48 which extends along the length of the body 42 or 44. Within the depicted assembly 20, the linear groove 46 of the body 42 defines a thread-including surface 54 which is shaped substantially complementary to the shape of the portion of the external threads 41 of the threaded rod 22 which extend along one side of the rod 22. Meanwhile, the linear groove 46 of the body 44 defines a thread-including surface 56 which is shaped substantially complimentary to the shape of a threaded rod (not shown) which is identical in construction to that of the rod 22, except that the rod (not shown) possesses a different diameter. Each body 42 or 44 of the depicted attachment assembly 20 is elongated in shape and has two opposite ends 58 and 60 and is substantially C-shaped in cross section. The front face 50 of each body 42 or 44 is provided by the interior surface of the C of the C-shape of the body 42 or 44, and the rear face 52 of each body 42 or 44 faces a direction which is substantially opposite the direction in which the surface 54 or 56 faces.

Because each surface 54 or 56 of the linear groove 46 or 48 of the bodies 42, 44 is provided with threads which are shaped substantially complimentary to those of the rod to which the assembly 20 is clamped, the surface 54 or 56 are in a condition to be positioned in a meshed relationship with the threads 41 of a rod to which the assembly 20 is intended to be clamped. In the interests of the present invention, the surface 54 or 56 of the linear groove 46 or 48 is positionable in a meshed relationship with the threaded surface of a rod when the threads, of the teeth of the threads, of the surface 54 or 56 are in an interlocked relationship with one another in much the same manner as the teeth of two gears are in a meshed relationship with one another.

The bodies 42, 44 are held in a substantially parallel relationship with one another, and to this end, each attachment assembly 20 includes a bracket portion 66 (best shown in FIGS. 3 and 4) having a substantially U-shaped cross section having a base section 68 and two leg sections 70, 72 which are joined to the base 68 so as to extend therefrom. Each leg section 70 or 72 includes a pair of semi-circular-shaped cutouts 74, 76 within which a corresponding body 42 or 44 is accepted, or cradled. In particular, one body 42 is inserted rear surface-first within the cutout 74 and is secured within the cutout 74 with welds, and the other body 44 is positioned rear surface-first within the cutout 76 and is secured within the cutout 76 with welds. Once secured within the cutouts 74, 76 in this manner, the bodies 42, 44 are held in a cradled condition by the bracket portion 66.

The base portion 68 of the bracket portion 66 also defines a centrally-disposed opening 78, and an externally-threaded shank 80 is positioned through the opening 78 and secured (e.g. welded) to the base portion 68 so that a free end, indicated 82, of the threaded shank 80 extends through the U-shape of the bracket portion 66.

Each attachment assembly 20 also includes means, generally indicated 84, with which the threaded rod 22 (or a rod having a different diameter) is secured within one of the bodies 42 or 44. Within the depicted attachment assembly 20, the clamping means 84 includes a jaw 86 in the form of an elongated member 88 having two opposite ends 90, 92 and which is substantially U-shaped in cross-section having a base section 94 and two leg sections 96, 98 which extend away from the base section 94. Each leg section 96 or 98 is shaped so as to provide a boss 100 adjacent the opposite ends 90, 92. In addition, the base section 94 of the elongated member 88 defines a centrally-disposed opening 102 through which the threaded shank 80 is loosely accepted, and a nut 104 is threaded about the shank 80 so that the elongated member 88 is disposed between the bodies 42 and 44 and the nut 104. Within the depicted assembly 20, the opening 102 of the elongated member 88 and the shank 80 are disposed along an axis which extends midway between the bodies 42, 44. Furthermore, the elongated member 88 is arranged upon the shank 80 so that the U of its cross sectional shape opens toward the bodies 42, 44.

In order to clamp the threaded rod 22 to the body 42, the nut 104 is loosened from, or backed along, the shank 80, as necessary, to enable the spacing defined between the body 42 and the elongated member 88 to accept the shank of the threaded rod 22 when the rod 22 is directed sideways into the spacing. Then, the nut 104 is tightened about the shank 80 so that the elongated member 88 moves toward and into a tightened relationship with the body 42 so that the threaded rod 22 is clamped (i.e. sandwiched) between the surface 54 of the grooves 46 of the body 42 and the leg sections 96, 98 of the elongated member 88. It is in this tightened relationship that the thread-including surface 54 of the linear groove 46 is in a meshed relationship with the threads 41 (FIG. 2) which extend along one side of the rod 22.

Stated another way and because the surface 54 defined along the linear groove 46 is shaped complementary to the shape of the threads 41 of the rod exterior surface 40, the clamped engagement of the threaded rod 22 against the thread-including surface 54 of the groove 46 holds the threads 41 of the rod 22 in meshed engagement with the surface of the groove 46. This meshed engagement ensures that the attachment assembly 20 is prevented from sliding, or shifting, downwardly along the rod 22 when supporting an item, and the attachment assembly 20 is advantageous in this respect.

Furthermore and for purposes of securing an item, such as the strut 38 (FIGS. 1 and 2), to the threaded rod 22 by way of the attachment assembly 20, the attachment assembly 20 also includes an elongated bracket 110 (FIGS. 2-5) which is fixedly joined to the bracket portion 66. The elongated bracket 110 is substantially U-shaped in cross section having a base section 112 and two leg sections 114, 116 which extends away from the base section 112. The bracket 110 is arranged in a base-to-base relationship with the bracket portion 66 so that the Us of the bracket portion 66 and the bracket 110 open in substantially opposite directions. Moreover, the base section 68 of the bracket portion 66 is positioned in abutting relationship with the base section 112 and are welded together to fixedly join the bracket 110 to the remainder of the attachment assembly 20.

In order to accept a strut 38 directed sideways into the U of the bracket 110, the leg sections 114 and 116 are spaced apart by a distance which is at least as great as the width of the strut 38 desired to be inserted into the U of the bracket 110. Furthermore and to aid in the securement of the strut 38 within the bracket 110, there is defined within one of the leg sections 114 an opening 118 (FIG. 3) and a nut 120 is welded to the exterior surface of the leg section 114 about the opening 118 so that the internally-threaded opening 122 of the nut 120 is axially-aligned with the opening 118. A bolt 124 having a shank 126 is threadably accepted by the internally-threaded opening 122 of the nut 120 so that after positioning the strut 38 within the U of the bracket 110, the head, indicated 128, of the bolt 124 can be tightened against the surface of the strut 38 through the opening 118 to secure the strut 38 to the attachment assembly 20. In other words, the bolt 124 is utilized as a set screw for clamping the strut 38 between the leg section 116 and the shank 126 of the bolt 124.

Moreover and if desired, a plurality of aligned sets of openings 130, 132, 134 and 136 can be provided in the leg sections 114, 116 to accept bolts (not shown) used to secure the strut 38 within the bracket 110. That is to say that since struts, like the strut 38 of FIG. 2, are commonly provided with through-openings 140 defined along the length of the strut, a through-opening 140 of the strut can be aligned with one set of the openings 130, 132, 134 and 136, and the shank of a bolt (not shown) can be directed through the aligned openings, and a nut (not shown) can be threaded about the shank of the bolt to secure the strut to the bracket 110.

Each component of the attachment assembly 20 is preferably constructed of steel, but other materials can be used.

Exemplary dimensions of the attachment assembly 20 are provided here as follows: The length of each body 42 or 44 is about 2.0 inches in length, and the surface 54 provided by the linear groove 46 is adapted to nestingly accept and mesh with the threads of a threaded rod having a diameter which measures about 0.625 inch while the surface 56 provided by the linear groove 48 is adapted to nestingly accept and mesh with the threads of a threaded rod having a diameter which measures about 0.5 inches; the elongated member 88 of the jaw 86 is about 3.0 inches in length, and its leg sections 70, 72 are about 1.0 inch apart; the threaded shank 80 measures about 0.375 inches in diameter and has a length of about 2.75 inches; the bracket portion 66 is about 3.0 inches in length and each cutout 74 or 76 defined in the leg sections 70 and 72 are about 0.75 inches in depth; and the bracket 110 is about 3.0 inches in length and its leg sections 114, 116 are about 1.625 inches apart and each leg section 114 or 116 is about 1.25 inches in length as measured from the base section 112.

It follows from the foregoing that an attachment assembly 20 has been described which is securable about a threaded rod 20 having external threads 41 extending along the length of the rod 22 to enable a support item, such as a strut 38, to be supported by the threaded rod 22 at a desired location along the length of the rod 22. The attachment assembly 20 includes a body 42 or 44 defining a linear groove 46 or 48 having a thread-including surface 54 or 56 which is shaped substantially complementary to the shape of the external threads of the threaded rod to which the body 42 or 44 is intended to be clamped and further includes clamping means 84 for clamping the surface 54 or 56 of the body 42 or 44 in a meshed relationship with the external threads of the threaded rod. In addition, a bracket 110 is fixedly secured to the bodies 42 and 44 to which a support item, such as the strut 38, can be attached so that by clamping the surface 54 or 56 of the body 42 or 44 in meshed relationship with the external threads of the threaded rod, the support item 38 can be attached to the bracket 110. The bodies 42 and 44 provide the attachment assembly 20 to be utilized with one of two threaded rods possessing diameters of different sizes, and the attachment assembly 20 is advantageous in this respect.

It will be understood that numerous modifications and substitutions can be had to the aforedescribed embodiment 20 without departing from the spirit of the invention. For example, although the aforedescribed embodiment 20 has been shown and described as possessing two bodies 42 and 44, an attachment assembly embodying features of the present invention can possess a single body, or even more than two bodies. Accordingly, the aforedescribed embodiment 20 is intended for the purpose of illustration and not as limitation.

The invention claimed is:

1. An attachment assembly securable about a rod having external threads extending along a portion of the length of the rod to enable a support item, such as a strut, to be supported by the rod at a desired location along the length of the rod, the attachment assembly comprising:

a body having a linear groove defining a surface which is shaped substantially complementary to the shape of the external threads which extend along one side of the portion of the length of the rod;

means for clamping the surface of the body in a meshed relationship with the external threads which extend along the portion of the length of the rod; and one bracket to which a support item can be attached is secured to the body so that by clamping the surface of the body in meshed relationship with the external threads which extend along the portion of the length of the rod, the support item can be attached to the rod by way of the one bracket; and wherein the body includes a front side along which the linear groove extends and a back side opposite the front side of the body, and the back side of the body is attached to the one bracket in a manner which cradles the body in a fixed relationship with the one bracket.

2. The attachment assembly as defined in claim 1 wherein the clamping means includes a movable jaw and means for moving the jaw toward from the surface of the body so that by positioning the externally-threaded portion of the rod between the surface of the body and the jaw and then moving the jaw toward the body so that the rod is sandwiched between the surface of the body and the jaw, the attachment assembly is secured to the rod.

3. The attachment assembly as defined in claim 2 wherein the jaw defines an opening therein, and the means for moving the jaw toward the surface of the body includes a threaded shank having two opposite ends and a nut, and one end of the threaded shank is secured to the body adjacent the surface thereof and the nut is threaded about the threaded shank on a side of the jaw opposite the surface of the body so that by positioning the rod between the surface of the body and the jaw and then tightening the nut about the threaded shank, the jaw is moved toward the body and into a clamped relationship with the rod.

4. The attachment assembly as defined in claim 3 wherein the rod is a first threaded rod, the body is a first body defining a first linear groove and wherein the attachment assembly further includes a second body having a second linear groove defining a surface which is shaped substantially shaped complimentary to the shape of the external threads which extend along one side of the portion of the length of a second rod having external threads which extend along a portion of the length of the second rod, the jaw includes an elongated member which is adapted to span both the first and second linear grooves, and the one end of the threaded shank is joined to the body so that the threaded shank is disposed between the first and second linear grooves.

5. The attachment assembly as defined in claim 4 wherein the elongated member of the jaw is substantially U-shaped in cross section and is arranged in such a relationship with the first and second linear grooves so that the U of the U-shape of the elongated member of the jaw opens toward the first and second linear grooves.

6. The attachment assembly as defined in claim 5 wherein the elongated member of the jaw has two opposite ends, and the opening which is defined in the jaw is located medially of the two opposite ends of the elongated member of the jaw.

7. The attachment assembly as defined claim 1 further including a cradling bracket including a cradling portion within which the back side of the body is cradled, and the cradling bracket is mounted between the one bracket and the body for securing the body to the one bracket.

8. The attachment assembly as defined in claim 7 wherein the cradling bracket is substantially U-shaped in cross section and is arranged in such a relationship to the linear groove of the body so that the U of the U-shape of the cradling bracket and the linear groove of the body open in substantially the same direction.

9. The attachment assembly as defined in claim 1 wherein the surface of the linear groove of the body is shaped substantially complimentary to the shape of the external threads of a rod having a diameter which is within the range of between about 0.375 and 0.875 inches.

10. An attachment assembly securable about a rod having an externally-threaded surface which extends along a portion of the length of the rod to enable a secondary item, such as a strut, to be supported by the rod at a desired location along the portion of the length of the rod, the attachment assembly comprising:

an elongated body defining a linear groove which extends along the length thereof, and the linear groove has a surface which is shaped substantially complimentary to the externally-threaded surface which extends along one side of the portion of the length of the rod;

means for clamping the elongated body to the rod so that the surface of the linear groove is in a meshed relationship with the externally-threaded surface which extends along one side of the portion of the length of the rod; and one bracket to which a support item can be attached being secured to the elongated body so that by clamping the elongated body to the rod as aforesaid, the support item can be attached to the rod by way of the one bracket; and wherein the body includes a front side along which the linear groove extends and a back side opposite the front side of the body, and the back side of the body is attached to the one bracket in a manner which cradles the body in a fixed relationship with the one bracket.

11. The attachment assembly as defined in claim 10 wherein the clamping means includes a movable jaw and means for moving the jaw toward the surface of the linear groove of the body so that by positioning the externally-threaded portion of the rod between the surface of the linear groove of the body and the jaw and then moving the jaw toward the body so that the rod is sandwiched between the surface of the linear groove of the body and the jaw, the attachment assembly is secured to the rod.

12. The attachment assembly as defined in claim 10 wherein the jaw defines an opening therein, and the means for moving the jaw toward the surface of the linear groove of the body includes a threaded shank having two opposite ends and a nut, and one end of the threaded shank is secured to the body adjacent the surface of the linear groove thereof and the nut is threaded about the threaded shank on a side of the jaw opposite the surface of the linear groove of the body so that by positioning the rod between the surface of the linear groove of the body and the jaw and then tightening the nut about the threaded shank, the jaw is moved toward the body and into a clamped relationship with the rod.

13. The attachment assembly as defined in claim 12 wherein the rod is a first rod, the body is a first body defining a first linear groove and wherein the attachment assembly further includes a second body having a second linear groove defining a surface which is shaped substantially shaped complimentary to the shape of the external threads which extend along one side of the portion of the length of a second rod having an externally-threaded surface which extends along a portion of the length of the second rod, the jaw includes an elongated member which is adapted to span both the first and second linear grooves, and the one end of the threaded shank is joined to the body so that the threaded shank is disposed between the first and second linear grooves.

14. The attachment assembly as defined in claim 13 wherein the elongated member of the jaw is substantially U-shaped in cross section and is arranged in such a relationship with the first and second linear grooves so that the U of the U-shape of the elongated member of the jaw opens toward the first and second linear grooves.

15. The attachment assembly as defined in claim 14 wherein the elongated member of the jaw has two opposite ends, and the opening which is defined in the jaw is located medially of the two opposite ends of the elongated member of the jaw.

16. The attachment assembly as claimed in claim 10 further including a cradling bracket including a cradling portion within which the back side of the body is cradled, and the cradling bracket is mounted between the one bracket and the body for securing the body to the one bracket.

17. The attachment assembly as defined in claim 16 wherein the cradling bracket is substantially U-shaped in cross section and is arranged in such a relationship to the linear groove of the body so that the U of the U-shape of the cradling bracket and the linear groove of the body open in substantially the same direction.

18. The attachment assembly as defined in claim 10 wherein the surface of the linear groove of the body is shaped substantially complimentary to the shape of the external threads of a rod having a diameter which is within the range of between about 0.375 and 0.875 inches.

19. An attachment assembly securable about one rod having an externally-threaded surface which extends along a portion of the length of the one rod to enable a secondary item, such as a strut, to be supported by the one rod at a desired location along the portion of the length of the one rod, the attachment assembly comprising:

a first elongated body defining a linear groove which extends along the length thereof, and the linear groove has a surface which is shaped substantially complimentary to the threaded surface which extends along one side of a first rod having an externally-threaded surface which extends along a portion of the length of the first rod;

a second elongated body defining a linear groove which extends along the length thereof, and the linear groove has a surface which is shaped substantially complimentary to the threaded surface which extends along one side of a second rod having an externally-threaded surface which extends along a portion of the length of the second rod;

means for supporting the first and second elongated bodies in a side-by-side relationship so that the linear grooves thereof are substantially parallel to one another and open in substantially the same direction;

means for clamping the first or second elongated body to the one rod so that the surface of the linear groove of the first or second elongated body is in a meshed relationship with the threaded surface which extends along one side of the portion of the length of the one rod; and one bracket to which a support item can be attached being secured to the supporting means so that by clamping the first or second elongated body to the one rod as aforesaid, the support item can be attached to the one rod by way of the one bracket; and wherein each of the elongated bodies includes a front side along which the linear groove extends and a back side opposite the front side of the body, and the back side of each elongated body is attached to the one bracket in a manner which cradles the body in a fixed relationship with the one bracket.

20. The attachment assembly as defined in claim 19 wherein the first and second rods to which the linear grooves of the first and second elongated bodies are capable of being clamped in meshed relationship possess diameters which are different from one another.

* * * * *